J. CASE.
Harvester Dropper.
No. 86,730. Patented Feb. 9, 1869.
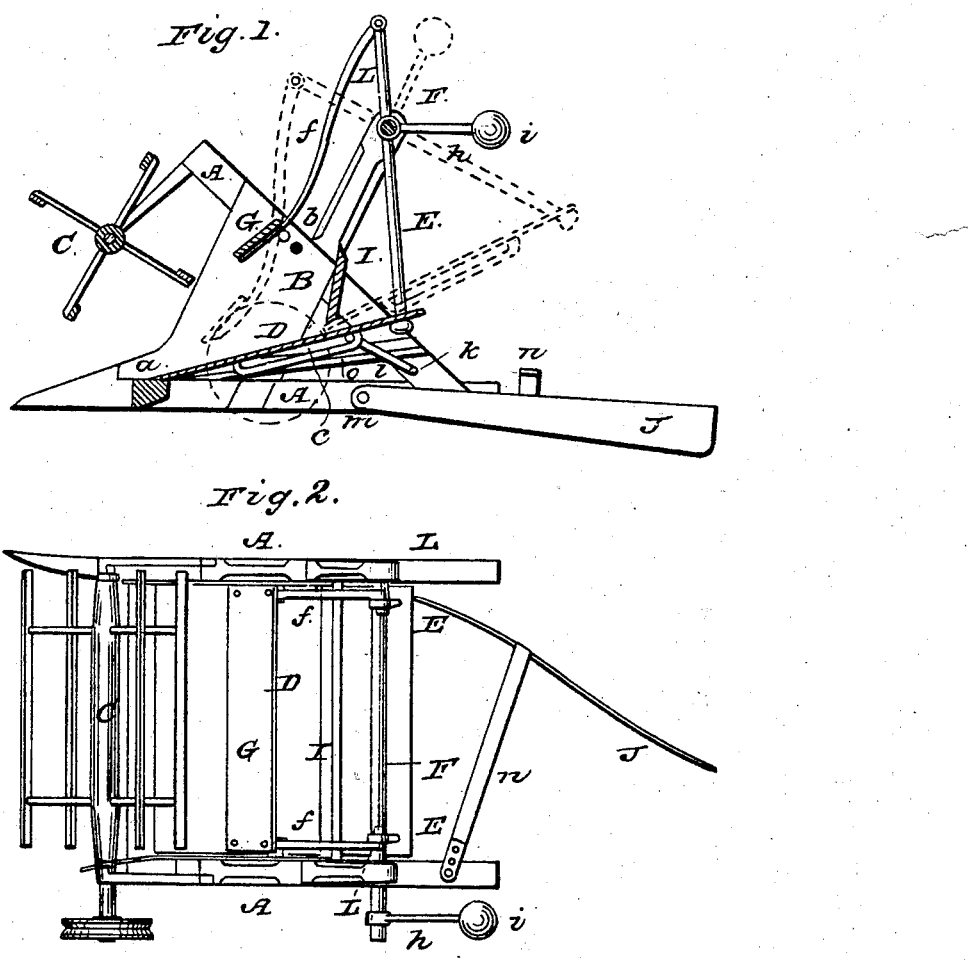

JARVIS CASE, OF LAFAYETTE, INDIANA.

Letters Patent No. 86,730, dated February 9, 1869.

IMPROVEMENT IN HARVESTER-DROPPERS.

The Schedule referred to in these Letters Patent and making part of the same.

*To all whom it may concern:*

Be it known that I, JARVIS CASE, of Lafayette, in the county of Tippecanoe, and State of Indiana, have invented certain new and useful Improvements in Droppers and Gavellers for Reapers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to machines for harvesting grain; and

It consists, first, of a new device, termed a dropper, which is arranged to drop the cut grain from the machine in quantities suitable to form bundles or gavels; and second, in a device for gathering the grain, thus dropped, into a compact or smaller mass, ready for binding; all as hereinafter more fully explained.

Figure 1 is a longitudinal vertical section, taken on the line *x-x* of fig. 2.

Figure 2 is a top plan view.

In harvesting-machines, it was formerly customary to use a rake to sweep the cut grain at intervals from the platform of the machine, but latterly, tilting-platforms have been used, of one style and another, so arranged as to drop the grain by the tilting of the device, and hence, are called "droppers."

With this class of droppers there has always existed this difficulty, that, when the grain is cut low, the dropper has to be placed so near the ground that it could be but slightly inclined, and therefore frequently fails to deliver the grain freely, and in a compact mass.

In constructing my improved dropper, I construct the frame A, of the platform, in any suitable form, and of the required size, the form shown in the drawing being a simple and cheap one, well adapted to the purpose.

The bottom, D, of the platform, I make of sheet-metal, or any light and rigid material, entirely loose from the frame, its front end resting on the frame just in rear of the sickle, which latter would be at *a*, fig. 1, the rear end of the bottom, D, being pivoted to rods or arms, E, which latter are secured to a rock-shaft, F, located in the upper part of the frame, as shown in fig. 1.

Underneath the edges of the bottom, D, at each side, I secure a cleat or bar, *o*, on which the front edge of the bottom rests and slides, as it is drawn back, as hereinafter explained.

Crosswise of the frame A, under the rear portion of the bottom, I locate a shaft, *l*, which has each end bent in the form of a crank, the ends being pivoted in the frame, as shown at *k*, fig. 1, the body of the shaft *l* passing through an elongated staple, *c*, secured to the under side of the bottom, these parts being so arranged that, when the platform or bottom, D, is thrown forward in proper position to receive the grain as it is cut, the shaft *l* will be in the position shown in fig. 1, when it will permit the bottom to rest nearly level.

As the bottom is drawn back, by turning the rock-shaft, F, the shaft *l* will remain in the position shown, until the front end of the staple or loop *c* is brought back far enough to strike the shaft *l*, when, by the further movement of the bottom, D, the shaft *l* will be turned up to the position shown in red, and will thereby elevate the front edge of the bottom, more or less, according to the length of the crank-arms of the shaft *l*.

Over the rear portion of the bottom, D, I secure to the frame a board, I, in such a position that, as the bottom is drawn back, the grain thereon will strike against this board, which will thus serve as a stop to hold the grain, while the bottom is drawn back from under the grain, thereby permitting the latter to fall upon the ground, the bottom, D, being elevated by the shaft *l* so as to pass over the dropped grain as the machine moves forward, and the dropper returns to its position again.

For the purpose of receiving whatever grain may be cut while the dropper, D, is being emptied, I provide a cut-off, G, which may consist of a flat strip of board or metal, as represented in the drawings.

This I secure to an arm or rod, *f*, at each end, these arms or rods being pivoted, at their upper ends, to arms, L, which may consist simply of an extension of the arms E from the opposite side of the rock-shaft F.

The position of the cut-off G may be varied, that is, it may be thrown forward or backward by changing the pins *b*, on which its arms *f* rest, from one to another of the holes provided for them in the frame, as represented in fig. 1.

With the parts thus arranged, it will be seen that, as the dropper or bottom, D, is drawn back, the cut-off G will be thrown down, as indicated in red in fig. 1, to the proper position to receive and hold the cut grain that falls upon it while the dropper is being emptied, and that, as the dropper returns to its position, the cut-off G will be drawn up, thereby letting the grain that rested on it fall upon the dropper, D.

In order to insure the speedy return of the dropper to its position, an arm, *h*, may be attached to the rock-shaft F, and have a weight, *i*, secured thereto, as shown.

It is obvious that, instead of the shaft *l* for elevating the dropper, other devices may be used, as, for instance, a pawl may be pivoted to the frame in such a position that, as the dropper D moves back, the pawls will engage in a recess, or against a projection on the under side of the dropper and throw it up, or, the dropper may have projections on its sides, which shall work in grooves or slots so shaped as to raise it as it moves back.

The device can be applied to any style of machine, and may be operated by the hand or foot, by means of suitable levers arranged for that purpose, or it may be connected to the machine in such a manner as to be operated thereby, and thus render it automatic in its operation. In the latter case it will, of course, be necessary to provide for operating it more or less frequently, according to the thickness and size of the straw or grain.

It is obvious that the grain will be delivered in a gavel or bunch as wide as the platform or dropper, and when thus spread, as is the case with all droppers, the binder must gather it up before he can apply the band. To remedy this difficulty I attach to the frame, on the side next to the standing grain, a device, which I term a gaveller.

This device consists simply of a strip of sheet-metal or wood, represented in the drawings by J, this piece standing edgewise, and being inclined as represented in fig. 2, so that, as the machine moves forward, it will press against the grain which has been dropped from the machine, and thus crowd it over into a much smaller and more compact mass, and more or less out of the way of the team on its next round.

This gaveller J is secured to the frame by a bolt, m, which may be tightened up, so as to hold the gaveller rigid, or it may be loosened, so as to let the gaveller play up and down at its rear end.

It is held, laterally, by a brace, n, which is provided with a series of holes, at the end where it is attached to the frame, so that the position or inclination of the gaveller may be varied as desired.

By these means I am enabled to construct a very simple, cheap, and efficient device.

Having thus described my invention,
What I claim, is—

1. So arranging the dropper or bottom, D, in combination with the crank-shaft l, or equivalent devices, that, as the dropper is moved back, its front end shall be elevated, the more readily to pass over the gavel without hitting it, substantially as described.

2. In combination with the sliding dropper D, the cut-off G and stop I, arranged to operate substantially as herein described.

3. The combination of the sliding dropper D and the stop I, arranged to operate as set forth.

JARVIS CASE.

Witnesses:
   W. C. DODGE,
   S. M. POOL.